Patented Oct. 22, 1940

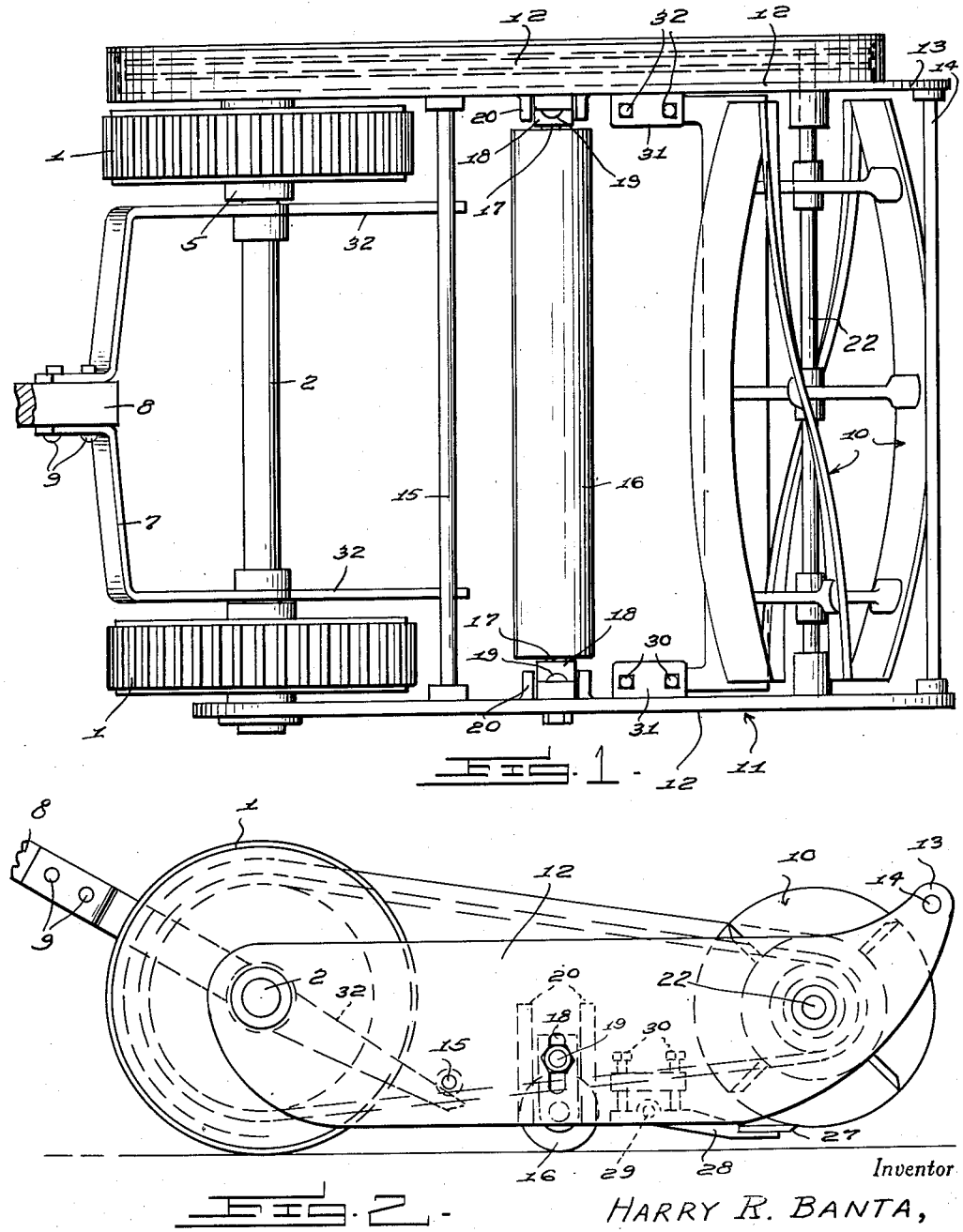

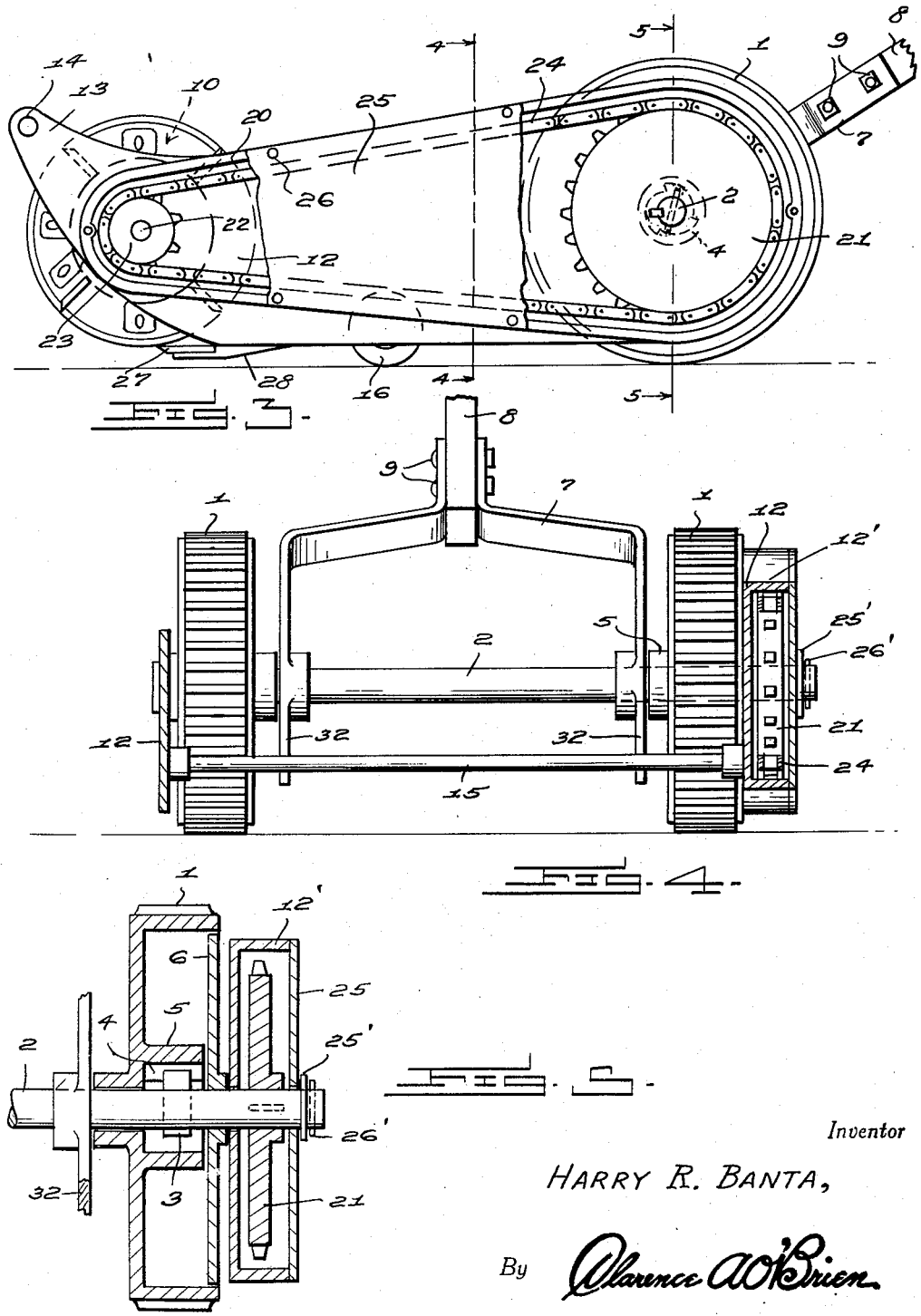

2,218,865

UNITED STATES PATENT OFFICE 2,218,865

LAWN MOWER

Harry R. Banta, Ashland, Oreg.

Application March 29, 1940, Serial No. 326,809

1 Claim. (Cl. 56—252)

My invention relates to improvements in lawn mowers and the principal object in view is to provide an implement of this character adapted for cutting, or mowing, forwardly of the traction wheels so that the grass is not mashed down by said wheels prior to cutting and so that cutting may be accomplished under shrubbery, and the like, without damage to the latter by said wheels.

To the accomplishment of the above, and subordinate objects presently appearing, a preferred embodiment of my invention has been illustrated in the accompanying drawings, set forth in the succeeding description, and defined in the claim appended hereto.

In said drawings:

Figure 1 is a view in top plan of a preferred embodiment of my invention,

Figure 2 is a view in side elevation looking at the right hand side of the implement, Figure 3 is a view in side elevation looking at the other side of the implement and partly broken away to show the drive, Figure 4 is a view in transverse section taken on the line 4—4 of Figure 3, and Figure 5 is a view in transverse vertical section taken on the line 5—5 of Figure 3.

Referring to the drawings by numerals, the lawn mower of my invention embodies the usual pair of dished ground wheels 1 journalled upon opposite ends of a drive shaft 2. One way driving clutches are provided between each wheel 1 and the shaft 2 in the form of the usual pin 3 slidable diametrically in the shaft 2 and coacting with cam teeth 4 in the hub 5 of the wheel in a manner well understood in the art and therefore requiring no further explanation. The shaft 2 is extended at each end beyond the wheels 1, for a purpose presently seen, and has suitably mounted thereon dust guard plates, as at 6, for closing the open sides of said wheels 1.

A handle carrying yoke 7 of the usual type, with the exceptions presently noted, is mounted on said shaft 2 for vertical rocking movement on the same between the wheels 1 and to which the forward end of the handle 8 is bolted, as at 9, for use in pushing the implement to propel the same.

The cutter reel 10, of the usual spiral blade type, is mounted, in a manner presently described in detail, in the front end of a frame 11 extending forwardly from the shaft 2 and vertically swingable thereon. The frame 11 comprises a pair of right and left side cheek plates 12 having rear ends journalled on the extended ends of shaft 2, respectively, and having upturned front ends 13 connected together by a cross tie rod 14. A second cross tie rod 15 extends between said plates 12 intermediate the ends thereof slightly in advance of the wheels 1 and adjacent to the lower edges of said plates.

A ground roller 16 is mounted at its opposite ends on the frame 11 to extend across the same in the rear of the cutting reel 10, said roller having trunnions 17 journalled in bearings 18 fixed to the plates 12, as at 19, between keeper flanges 20 on said plates.

One of the cheek plates 12, preferably the left side one, has formed thereon a continuous lateral flange 12' on the outer face thereof forming an elongated housing through one end of which one extended end of the shaft 2 projects and has fast thereon within said housing, a large sprocket wheel 21.

The cutter reel 10 embodies a shaft 22 journalled at its opposite ends in the front ends of said plates 12, respectively, one end of the shaft 22 extending into said housing and having fast thereon within the housing a small sprocket wheel 23. A sprocket chain 24 connects the sprocket wheels 21, 23, in driving and driven relation. A cover plate 25 bolted to the flange 12' as at 26, closes the open side of said housing. The shaft 2 extends through said plate 25 with a washer 25' thereon and a cotter pin 26' therein to further secure said plate in position.

A fixed cutter bar 27 for coaction with the blades of the cutter reel 10 to effect a shearing action, is provided beneath said reel 10, said blade being suitably secured at its opposite ends to the front ends of a pair of bars 28 mounted to rock upon studs, as at 29, on the plates 12 for vertical adjustment of said blades 27 under adjustment of set screws 30 threaded into lugs 31 on said plates 12, all in a manner which will be clear from an inspection of Figures 1 and 2.

Returning now to the yoke 7, said yoke comprises side arms 32 journalled on the shaft 2 and extending forwardly thereof beneath the tie rod 15 so that said arms together with said rod, form a pick up connection whereby under downward swinging of the handle 8 the described frame 11 may be swung upwardly on the shaft 2 to cause the roller 16 to be raised off the ground and thereby facilitate turning the implement.

The manner in which the described lawn mower is operated will be obvious. The frame 11 is supported by the ground roller 16 as the implement is operated by the handle 8 in the usual manner. The reel 10 coacts with the cutter bar 27 to shear the grass well in advance of the ground wheels 1 so that said reel may be thrust under shrubbery and the like to cut without forcing the wheels into the same and without mashing down the grass in advance of the reel. By bearing downwardly on the handle 8, the frame 11, reel 10, ground roller 16 and cutter bar 27 may all be easily lifted off the ground in turning, or, when it is desired to cease cutting. As will be readily seen, the mower of my invention is of simple construction, inexpensive to manufacture, and well adapted for the purposes for which it was intended.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

In a lawn mower, a wheel supported shaft, one way driving clutches between said wheels and shaft, a frame extending forwardly from said shaft and comprising side cheek plates vertically swingable on said shaft, a cutter reel journalled in the front ends of said plates, respectively, for elevation under such swinging of said plates and including cutter blades, a cutter bar extending between said plates and fixed thereto for coaction with said blades to effect a shearing action, a ground roller mounted at its opposite ends in said plates, respectively, in the rear of said reel and supporting said plates, reel and cutter bar, a handle carrying yoke journalled on said shaft for vertical rocking movement thereon, and having a handle extending rearwardly therefrom, driving connections between one end of said shaft and said reel, and pick-up connections between said yoke and plates, respectively, for swinging said plates upwardly on said shaft under pressure exerted downwardly on said handle and yoke to thereby elevate the ground roller, reel and cutter bar, said connections comprising arms on said yoke extending forwardly of said shaft, and a tie-bar extending between said plates and overlying said arms.

HARRY R. BANTA.